US011580367B2

(12) United States Patent
Du et al.

(10) Patent No.: US 11,580,367 B2
(45) Date of Patent: Feb. 14, 2023

(54) METHOD AND SYSTEM FOR PROCESSING NEURAL NETWORK

(71) Applicant: Institute of Computing Technology, Chinese Academy of Sciences, Beijing (CN)

(72) Inventors: Zidong Du, Beijing (CN); Qi Guo, Beijing (CN); Tianshi Chen, Beijing (CN); Yunji Chen, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 1155 days.

(21) Appl. No.: 16/079,525

(22) PCT Filed: Aug. 9, 2016

(86) PCT No.: PCT/CN2016/094189
§ 371 (c)(1),
(2) Date: Aug. 23, 2018

(87) PCT Pub. No.: WO2017/181562
PCT Pub. Date: Oct. 26, 2017

(65) Prior Publication Data
US 2019/0087716 A1   Mar. 21, 2019

(30) Foreign Application Priority Data

Apr. 18, 2016   (CN) .......................... 201610240416.X

(51) Int. Cl.
*G06N 3/06*   (2006.01)
*G06F 7/57*   (2006.01)
(Continued)

(52) U.S. Cl.
CPC ............... *G06N 3/063* (2013.01); *G06F 7/57* (2013.01); *G06F 15/78* (2013.01); ***G06F 15/7*86* (2013.01); *G06N 3/0454*** (2013.01)

(58) Field of Classification Search
CPC .... G06F 7/726; G06F 15/30079; G06N 3/063
See application file for complete search history.

(56) References Cited

U.S. PATENT DOCUMENTS 5,974,487 A * 10/1999 Hartmann ........... H04L 12/4637
709/251
2007/0022063 A1* 1/2007 Lightowler ............ G06N 3/063
706/15
(Continued)

FOREIGN PATENT DOCUMENTS

CN   101639901 A   2/2010
CN   104346622 A   2/2015
(Continued)

OTHER PUBLICATIONS

Zhu et al.; "The Design and Implementation of Reconfigurable Multilayer Perctrons Neural Network Based on MPSoC;" Microelectronics & Computer, vol. 31, No. 11; Nov. 2014; pp. 27-31; China Academic Journal Electronic Publishing House, China.
International Search Report dated Jan. 5, 2017 for PCT Application No. PCT/CN2016/094189.

*Primary Examiner* — Getente A Yimer
(74) *Attorney, Agent, or Firm* — Maschoff Brennan

(57) ABSTRACT

The present disclosure provides a neural network processing system that comprises a multi-core processing module composed of a plurality of core processing modules and for executing vector multiplication and addition operations in a neural network operation, an on-chip storage medium, an on-chip address index module, and an ALU module for executing a non-linear operation not completable by the multi-core processing module according to input data acquired from the multi-core processing module or the
(Continued)

on-chip storage medium, wherein the plurality of core processing modules share an on-chip storage medium and an ALU module, or the plurality of core processing modules have an independent on-chip storage medium and an ALU module. The present disclosure improves an operating speed of the neural network processing system, such that performance of the neural network processing system is higher and more efficient.

10 Claims, 3 Drawing Sheets

(51) Int. Cl.
*G06F 15/78* (2006.01)
*G06N 3/04* (2006.01)
*G06N 3/063* (2023.01)

(56) References Cited

U.S. PATENT DOCUMENTS

| 2010/0158005 A1* | 6/2010 | Mukhopadhyay .... H04L 49/109 |
| | | 370/392 |
| 2012/0221293 A1* | 8/2012 | Parker ................. G06F 11/3476 |
| | | 702/182 |
| 2013/0138918 A1* | 5/2013 | Muff .................... G06F 15/7825 |
| | | 712/E9.028 |
| 2014/0169553 A1* | 6/2014 | Chen ........................ G06F 7/726 |
| | | 380/28 |
| 2019/0056941 A1* | 2/2019 | Wang .................. G06F 9/30079 |

FOREIGN PATENT DOCUMENTS

| CN | 105469143 A | 4/2016 |
| CN | 105488565 A | 4/2016 |
| CN | 205139973 U | 4/2016 |
| WO | 2005/024625 A1 | 3/2005 |

* cited by examiner

METHOD AND SYSTEM FOR PROCESSING NEURAL NETWORK

TECHNICAL FIELD

The present disclosure relates to the technical field of computers, and belongs to a method and system for processing a neural network.

BACKGROUND

In the era of big data, more and more devices are required to perform more and more complex processing on real-time input of the real world, such as, industrial robots, automatic driving of unmanned car and mobile devices, etc. These tasks are mostly partial to the machine learning field, where most operations are vector operations or matrix operations, which have a high degree of parallelism. As compared to the traditional common GPU/CPU acceleration scheme, the hardware ASIC accelerator is the most popular acceleration scheme at present. On one hand, it can provide a high degree of parallelism and can achieve high performance, and on the other hand, it has high energy efficiency.

In the common neural network algorithm, it comprises the most popular Multi-Layer Perceptron (MLP) neural network, Convolutional Neural Network (CNN), and Deep Neural Network (DNN). They generally comprise multiple layers of neurons, and each layer of neurons is often organized in a specific way. For example, in the CNN, the neurons are organized in accordance with a feature map. Processing of each output feature map is often independent from one another.

Most operations of the neural network are processing from input neurons to output neurons, and a few operations are operations in which participation of output neurons is not required, such as, a non-linear operation. An operating speed of each layer in the neural network has a deep influence on the performance of neural network accelerator. In the neural network accelerator, the main method of improving the performance of neural network accelerator is to improve a degree of parallelism of these operations, i.e., a throughput of the accelerator. In the prior art, a module executing processing from input neurons to output neurons is often a single-core design, which is difficult to satisfy the requirements for the performance of the neural network accelerator.

In conclusion, the prior art obviously has inconvenience and deficiencies in practical use, so it is necessary to make improvement.

SUMMARY

With respect to the above deficiencies, an object of the present disclosure is to provide a method and system for processing a neural network, which introduce a multi-core design in a neural network processing system, so as to improve the operating speed of the neural network processing system, such that performance of the neural network processing system is higher and more efficient.

In order to achieve the object, the present disclosure provides a system for processing a neural network, comprising:

at least one on-chip storage medium for storing data transmitted from outside of a neural network processing system, or storing data generated during processing;

at least one on-chip address index module for executing mapping according to an input index to a correct storage address during operation;

a multi-core processing module composed of a plurality of core processing modules and for executing vector multiplication and addition operations in a neural network operation, and at least one ALU module for executing a non-linear operation not completable by the multi-core processing module according to input data acquired from the multi-core processing module or the on-chip storage medium, wherein the plurality of core processing modules share the on-chip storage medium and the ALU module, or the plurality of core processing modules have an independent on-chip storage medium and an ALU module.

According to the processing system of the present disclosure, the data generated during processing comprises a processing result or an intermediate settlement result.

According to the processing system of the present disclosure, when the neural network processing system processes, the same input neuron is transmitted respectively to the plurality of core processing modules, different input weights are distributed to different core processing modules, and the plurality of core processing modules obtain different output neurons after performing a vector inner product operation on the input neuron and the input weights.

According to the processing system of the present disclosure, when the neural network processing system executes two-dimensional or multidimensional operations, input feature maps are transmitted respectively to the plurality of core processing modules, and the plurality of core processing modules process one layer of output feature maps, respectively.

According to the processing system of the present disclosure, when the neural network processing system executes two-dimensional or multidimensional operations, input feature maps are transmitted respectively to the plurality of core processing modules, and the plurality of core processing modules process different regions of the same output feature map, respectively.

According to the processing system of the present disclosure, after the plurality of core processing modules complete processing of the current output feature map, respectively, the multi-core processing module executes processing of new output feature map.

According to the processing system of the present disclosure, when the neural network processing system executes one-dimensional operations, the same input is transmitted respectively to the plurality of core processing modules, the plurality of core processing modules process different output neurons, respectively, and after the plurality of core processing modules complete processing of the current output neuron, respectively, the multi-core processing module executes processing of new input.

According to the processing system of the present disclosure, the plurality of core processing modules of the multi-core processing module are an isomorphic design or an isomeric design.

The present disclosure correspondingly provides a method for processing a neural network, comprising:

mapping, by an on-chip address index module, according to an input index to a correct storage address;

acquiring input data from an on-chip storage medium according to the storage address;

transmitting the input data to a multi-core processing module or an ALU module;

executing, by the multi-core processing module, vector multiplication and addition operations in a neural network operation, and executing, by the ALU module, a non-linear operation not completable by the multi-core processing module according to a processing result of the multi-core processing module, or the input data acquired from the on-chip storage medium; and caching data generated during processing in the on-chip storage medium.

According to the processing method of the present disclosure, the method further comprises: transmitting the same input neuron respectively to the plurality of core processing modules, distributing different input weights to different core processing modules, and obtaining, by the plurality of core processing modules, different output neurons after performing a vector inner product operation on the input neuron and the input weights.

DETAILED DESCRIPTION

In order to make the object, the technical solution and the advantages of the present disclosure clearer, the present disclosure is further explained in detail with reference to the drawings and the examples. It shall be understood that the specific examples described here are only to explain the present disclosure, instead of limiting the present disclosure.

Figure 1:
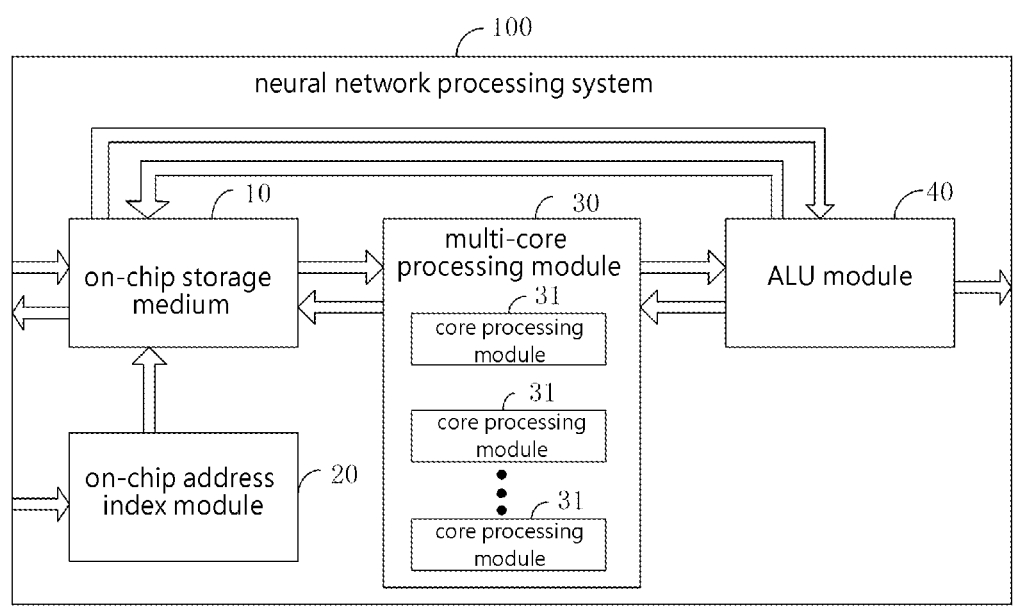
FIG. 1 is a structure diagram of one example of the system for processing a neural network according to the present disclosure.

As shown in FIG. 1, the present disclosure provides a neural network processing system 100, comprising at least one on-chip storage medium 10, at least one on-chip address index module 20, a multi-core processing module 30 and at least one Arithmetic Logic Unit (ALU) module 40. The multi-core processing module 30 comprises a plurality of core processing modules 31. The on-chip address index module 20 is connected to the on-chip storage medium 10, and the on-chip address index module 20, the multi-core processing module 30 and the ALU module 40 are respectively connected to each other. The multi-core processing module 30 is used for executing vector multiplication and addition operations in a neural network operation, and the ALU module 40 is used for executing a non-linear operation not completable by the multi-core processing module 30 according to input data acquired from the multi-core processing module 30 or the on-chip storage medium 10. In this example, the plurality of core processing modules 31 share the on-chip storage medium 10 and the ALU module 40.

The on-chip storage medium 10 is used for storing data transmitted from outside of a neural network processing system, or storing data generated during processing. The data generated during processing comprises a processing result or an intermediate result generated during processing. These results may come from an on-chip core operation module of an accelerator, and also may come from other operating element, such as, the ALU module 40 in the present disclosure. The on-chip storage medium 10 can be common storage mediums, such as, a Static Random Access Memory (SRAM), a Dynamic Random Access Memory (DRAM), an Enhanced Dynamic Random Access Memory (eDRAM), a Register file (RF) and the like, and also may be a novel storage device, such as, a Non-Volatile Memory (NVM), or a 3D storage device.

The on-chip address index module 20 is used for executing mapping according to an input index to a correct storage address during operation, so as to transmit correct data to the multi-core processing module 30 for processing, such that the data can correctly interact with the on-chip storage medium. This address mapping process comprises directly mapping, arithmetic transformation and the like. The index module can be implemented by hardware circuits (including but not limited to a FPGA, a CGRA, an Application Specific Integrated Circuit (ASIC), an artificial circuit, and a memristor, etc.).

The multi-core processing module 30 comprises a plurality of core processing modules 31, and is used for executing vector multiplication and addition operations in a neural network operation. Specifically, the multi-core processing module 30 completes most operations, which are linear operations, i.e., multiplication and addition operations, in the neural network algorithm. The structure of each core processing module 31 can be various, such as, the implementing way of one-dimensional processing element (PE), two-dimensional PE, or multidimensional PE. The single core processing module 31 itself is not limited to a specific implementing principle, and comprises different implementing ways, such as, a systolic scheme, matrix vector multiplication and addition operators. Moreover, the plurality of core processing modules 31 of the multi-core processing module 30 can be an isomorphic design or an isomeric design. These processing modules can be implemented by hardware circuits (including but not limited to a FPGA, a CGRA, an Application Specific Integrated Circuit (ASIC), an artificial circuit, and a memristor, etc.).

The ALU module 40 is used for executing a non-linear operation not completable by the core processing module according to input data acquired from the multi-core processing module 30 or the on-chip storage medium. This module can be implemented by hardware circuits (including but not limited to a FPGA, a CGRA, an Application Specific Integrated Circuit (ASIC), an artificial circuit, and a memristor, etc.). In the present disclosure, a data channel of the multi-core processing module 30, the ALU module 40 and the on-chip storage medium 10 includes but not limited to interconnection techniques of H-TREE, or FAT-TREE.

In the present disclosure, the plurality of core processing modules 31 share input of a reused section to reduce bandwidth requirements. When the neural network processing system 100 processes, the same input neuron is transmitted respectively to the plurality of core processing modules 31 of the multi-core processing module 30, different input weights are distributed to different core processing modules 31, and the plurality of core processing modules 31 obtain different output neurons after performing a vector inner product (multiplication and addition) operation on the input neuron and the input weights. Different output neurons correspond to different weights, i.e., as for processing different output neurons, the input neuron is the same, and the weights are different. In the present disclosure, the weights cannot be reused by a plurality of cores in most cases. However, in some cases, if the plurality of cores process the same feature map together, the weights also can be reused.

The present disclosure improves a processing speed of the core operating section in the neural network algorithm by improving the number of on-chip core processing modules relative to the core processing section of the neural network processing system, such that the accelerator acquires higher performance. The core processing refers to the vector multiplication and addition operations occupying most of processing time in the neural network algorithm. Therefore, the present disclosure can improve an operating speed of the neural network processing system, such that performance of the neural network processing system is higher and more efficient.

Figure 2:
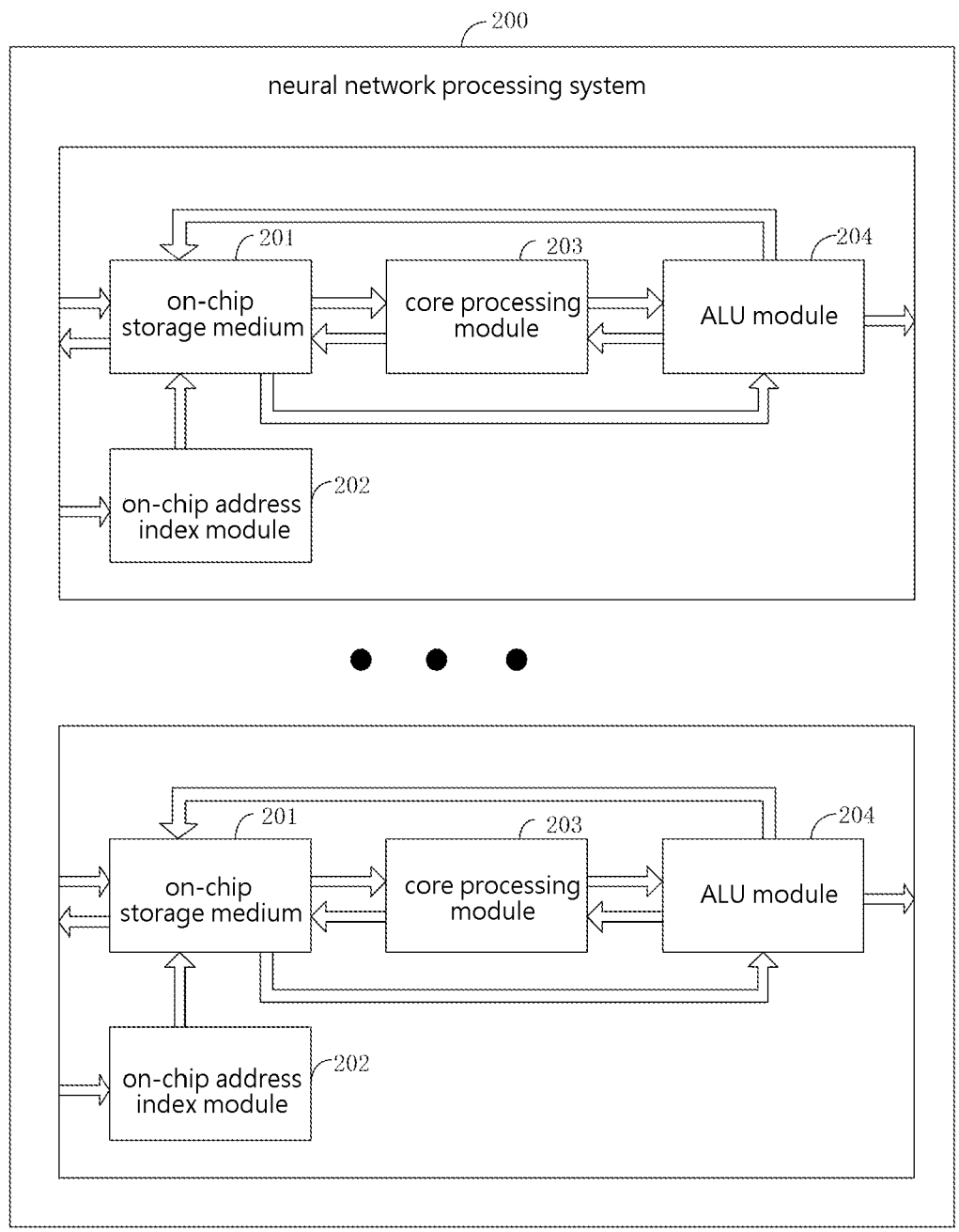
FIG. 2 is a structure diagram of another example of the system for processing a neural network according to the present disclosure.

FIG. 2 is a structure diagram of another example of a system for processing a neural network according to the present disclosure, which differs from the system for processing a neural network in FIG. 1 in that, the system for processing a neural network in FIG. 1 adopts a loose coupling design, while the system for processing a neural network in FIG. 2 adopts a tight coupling design. In FIG. 2, the neural network processing system 200 comprises a plurality of on-chip storage mediums 201, a plurality of on-chip address index modules 202, a plurality of core processing modules 203 and a plurality of ALU modules 204, wherein each core processing module 203 has a separate input interface and an input structure, and wherein the ALU modules 204 can also be partitioned into each core.

In FIG. 1, the plurality of core processing modules 31 only complete specific core operations, and themselves do not have more functions, and the multi-core processing core shares the on-chip storage medium 10 and the ALU module 40. In comparison, in the tight coupling design of FIG. 2, each core processing module 203 has its independent on-chip storage medium 201 and the ALU module 204. In the loose coupling design shown in FIG. 1, the plurality of cores can process cooperatively, which easily achieves requirements for higher performance, but each core lacks flexibility. In the tight coupling design shown in FIG. 2, each core has a certain flexibility, but since independence of each core makes multi-core cooperation more complicated, complexity of controlling increases. The loose coupling is often adapted to a multi-core isomorphic design, and the tight coupling is often adapted to a multi-core isomeric design.

In the present disclosure, the neural network can be designed according to a multi-core processing mode to partition the neural network, wherein it comprises partitioning from input neurons, partitioning from output neurons, and partitioning from a weight connection. Neural network partitioning is decomposition of the neural network processing mode, instead of partitioning the neural network into independent subnets, i.e., partitioning is performed on an algorithm level, and is an operation completed by a software or a compiler, and the object is to partition the neural network into several sections that can be processed by the plurality of cores.

Figure 3:
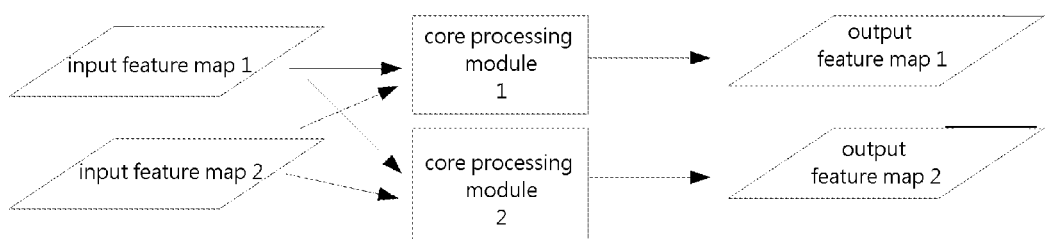
FIG. 3 is a schematic diagram of neural network partitioning in one example of the present disclosure.
Figure 4:
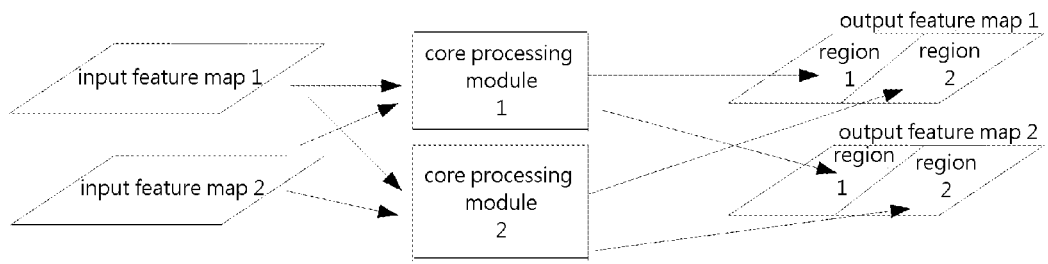
FIG. 4 is a schematic diagram of neural network partitioning in another example of the present disclosure.
Figure 5:
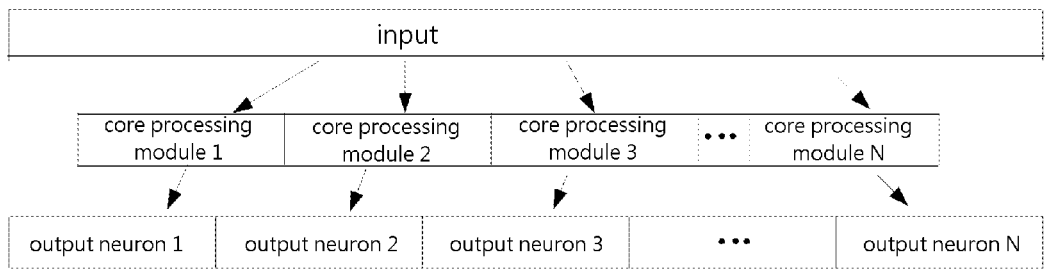
FIG. 5 is a schematic diagram of neural network partitioning in still another example of the present disclosure.

FIG. 3 is a schematic diagram of neural network partitioning in one example of the present disclosure, FIG. 4 is a schematic diagram of neural network partitioning in another example of the present disclosure, and FIG. 5 is a schematic diagram of neural network partitioning in still another example of the present disclosure.

In processing the neural network, a convolutional layer is organized in accordance with a feature map, i.e., a plurality of maps are input, and a plurality of maps are output. In FIG. 3, as for two-dimensional or three-dimensional operations, one layer of output feature maps can be processed in accordance with each core to partition the neural network from an output angle. In FIG. 3, it comprises an input feature map 1, an input feature map 2, a core processing module 1, a core processing module 2, an output feature map 1 and an output feature map 2, and each feature map is a two-dimensional matrix. When processing, the input feature maps 1 and 2 are transmitted respectively to the core processing modules 1 and 2, the core processing module 1 processes the output feature map 1, the core processing module processes the output feature map 2, and the core processing modules 1 and 2 process one layer of output feature maps, respectively. That is, when making two-dimensional or multidimensional process, the input feature maps are transmitted respectively to a plurality of core processing modules, and the plurality of core processing modules process one layer of output feature maps, respectively. After the plurality of core processing modules complete processing of the current output feature map, respectively, the multi-core processing module executes processing of new output feature map. That is, only if all cores complete processing of the current output feature map, a new feature map is processed.

In practical application, the input feature maps, the core processing modules and the output feature maps can be multiple. Taking two cores (#1, #2), four output feature maps (#1, #2, #3, #4), and four input feature maps (#1, #2, #3, #4) for example, the processing way of the multi-core processing module is explained below. After processing begins, the core #1 is responsible for processing the output feature map #1, the core #2 is responsible for processing the output feature map #2, the input feature map #1 is transmitted to the cores #1 and #2 (i.e., sharing the input feature map #1), and the corresponding weight is also transmitted to the cores #1 and #2 for processing simultaneously. When processing of the input feature map #1 is completed, the input feature map #2 is read from the on-chip storage, and transmitted to the cores #1 and #2 for processing (while reading the weight). When the cores #1 and #2 complete processing of the output feature maps #1 and #2, the cores #1 and #2 begin to process output feature maps #3 and #4, i.e., the above operation process is repeated.

As shown in FIG. 4, as for two-dimensional or multidimensional operations, one layer of output feature maps can be processed in accordance with each core to partition the neural network from an output angle. Different cores are responsible for processing different regions of the same feature map. Input is correspondingly transmitted to each core, and weight is read according to a corresponding connection. Here, the weight may be reused, such as, the convolutional layer in the CNN. Only if all cores complete processing of the current output feature map, a new feature map is processed. In FIG. 4, the input feature map 1 and the input feature map 2 are transmitted to the core processing module 1 and the core processing module 2, the core processing module 1 is responsible for processing a region 1 of the output feature map 1 and a region 1 of the output feature map 2, and the core processing module 2 is responsible for processing a region 2 of the output feature map 1 and a region 2 of the output feature map 2. Hence, when two-dimensional or multidimensional operations are executed, input feature maps are transmitted respectively to the plurality of core processing modules, and the plurality of core processing modules process different regions of the same output feature map, respectively. After the plurality of core processing modules complete processing of the current output feature map, respectively, the multi-core processing module executes processing of new output feature map.

As shown in FIG. 5, as for one-dimensional operations, a part of output is processed in accordance with each core processing module to partition the neural network from an output angle. Each core is responsible for processing different neurons, and the partitioning way can be various, and is not limited to the partitioning method shown in FIG. 5. Input is transmitted to each core processing module, weight is read according to a corresponding connection, and only if all core processing modules complete processing of the current output feature map, a new feature map is processed. That is, when the neural network processing system executes one-dimensional operations, the same input is transmitted respectively to the plurality of core processing modules, the plurality of core processing modules process different output neurons, respectively, and after the plurality of core processing modules complete processing of the current output neuron, respectively, processing of new input is executed.

Neural network partitioning comprises partitioning from input neurons, partitioning from output neurons, and partitioning from a weight connection. The present disclosure is partitioned in accordance with the output neurons, and several and even all input neurons are required to participate in processing the output neurons. However, in most cases, processing of the output neurons is independent from one another. The input neurons can be reused in accordance with partitioning of the output neurons to reduce bandwidth requirements, such that the accelerator is more efficient.

Figure 6:
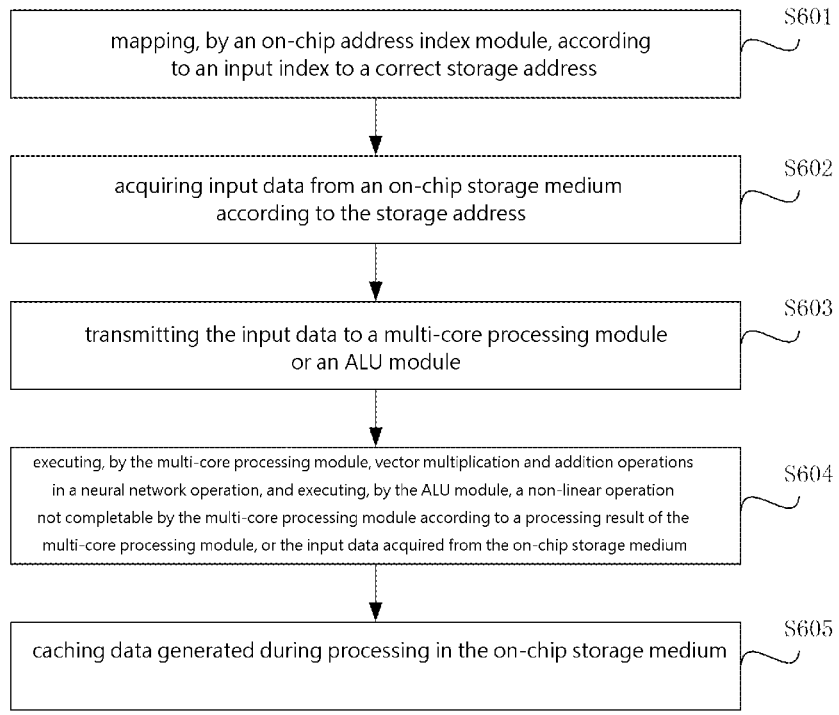
FIG. 6 is a flow diagram of the method for processing a neural network according to the present disclosure.

FIG. 6 is a flow diagram of a method for processing a neural network according to the present disclosure. The method comprises:

Step S601, mapping, by an on-chip address index module, according to an input index to a correct storage address;

Step S602, acquiring input data from an on-chip storage medium according to the storage address;

Step S603, transmitting the input data to a multi-core processing module or an ALU module; Step S604, executing, by the multi-core processing module, vector multiplication and addition operations in a neural network operation, and executing, by the ALU module, a non-linear operation not completable by the multi-core processing module according to a processing result of the multi-core processing module, or the input data acquired from the on-chip storage medium; and Step S605, caching data generated during processing in the on-chip storage medium.

Preferably, the method further comprises: transmitting the same input neuron respectively to the plurality of core processing modules, distributing different input weights to different core processing modules, and obtaining, by the plurality of core processing modules, different output neurons after performing a vector inner product operation on the input neuron and the input weights.

In conclusion, the present disclosure improves a processing speed of the core operating section in the neural network algorithm by improving the number of on-chip core processing modules relative to the core processing section of the neural network processing system, such that the accelerator acquires higher performance. The core processing refers to the vector multiplication and addition operations occupying most of processing time in the neural network algorithm. Therefore, the present disclosure can improve an operating speed of the neural network processing system, such that performance of the neural network processing system is higher and more efficient.

Certainly, the present disclosure also may have other multiple examples, and without departing from the spirit and substance of the present disclosure, those skilled in the art shall make various corresponding modifications and variations according to the present disclosure, but these corresponding modifications and variations shall belong to the scope protected by the appended claims.

INDUSTRIAL APPLICABILITY

The present disclosure improves a processing speed of the core operating section in the neural network algorithm by improving the number of on-chip core processing modules relative to the core processing section of the neural network processing system, such that the accelerator acquires higher performance. The core processing refers to the vector multiplication and addition operations occupying most of processing time in the neural network algorithm. Therefore, the present disclosure can improve an operating speed of the neural network processing system, such that performance of the neural network processing system is higher and more efficient.

What is claimed is:

1. A system for processing a neural network, comprising:
at least one on-chip storage medium for storing data transmitted from outside of a neural network processing system, or storing data generated during processing;
at least one on-chip address index module for executing mapping according to an input index to a correct storage address during operation;
a multi-core processing module composed of a plurality of core processing modules and for executing vector multiplication and addition operations in a neural network operation, and
at least one Arithmetic Logic Unit (ALU) module for executing a non-linear operation not completable by the multi-core processing module according to input data acquired from the multi-core processing module or the on-chip storage medium,
wherein the plurality of core processing modules share the on-chip storage medium and the ALU module, or the plurality of core processing modules have an independent on-chip storage medium and an ALU module,
wherein when the neural network processing system processes, the same input neuron is transmitted respectively to the plurality of core processing modules, different input weights are distributed to different core processing modules, and the plurality of core processing modules obtain different output neurons after performing a vector inner product operation on the input neuron and the input weights.

2. The processing system according to claim 1, wherein the data generated during processing comprises a processing result or an intermediate settlement result.

3. The processing system according to claim 1, wherein when the neural network processing system executes two-dimensional or multidimensional operations, input feature maps are transmitted respectively to the plurality of core processing modules, and the plurality of core processing modules process one layer of output feature maps, respectively.

4. The processing system according to claim 1, wherein when the neural network processing system executes two-dimensional or multidimensional operations, input feature maps are transmitted respectively to the plurality of core processing modules, and the plurality of core processing modules process different regions of the same output feature map, respectively.

5. The processing system according to claim 3, wherein after the plurality of core processing modules complete processing of the current output feature map, respectively, the multi-core processing module executes processing of new output feature map.

6. The processing system according to claim 4, wherein after the plurality of core processing modules complete processing of the current output feature map, respectively, the multi-core processing module executes processing of new output feature map.

7. The processing system according to claim 1, wherein when the neural network processing system executes one-dimensional operations, the same input is transmitted respectively to the plurality of core processing modules, the plurality of core processing modules process different output neurons, respectively, and after the plurality of core processing modules complete processing of the current output neuron, respectively, the multi-core processing module executes processing of new input.

8. The processing system according to claim 1, wherein the plurality of core processing modules of the multi-core processing module are an isomorphic design or an isomeric design.

9. A method for processing a neural network, comprising:
mapping, by an on-chip address index module, according to an input index to a correct storage address;
acquiring input data from an on-chip storage medium according to the storage address;
transmitting the input data to a multi-core processing module or an Arithmetic Logic Unit (ALU) module;
executing, by the multi-core processing module, vector multiplication and addition operations in a neural network operation, and executing, by the ALU module, a non-linear operation not completable by the multi-core processing module according to a processing result of the multi-core processing module, or the input data acquired from the on-chip storage medium;
caching data generated during processing in the on-chip storage medium; and
transmitting the same input neuron respectively to the plurality of core processing modules, distributing different input weights to different core processing modules, and obtaining, by the plurality of core processing modules, different output neurons after performing a vector inner product operation on the input neuron and the input weights.

10. The processing method according to claim 9, further comprising:
transmitting the same input neuron respectively to the plurality of core processing modules, distributing different input weights to different core processing modules, and obtaining, by the plurality of core processing modules, different output neurons after performing a vector inner product operation on the input neuron and the input weights.

\* \* \* \* \*